United States Patent [19]
Guillot

[11] 3,722,214
[45] Mar. 27, 1973

[54] GEARBOX FOR CONTROLLING THE MECHANISMS OF A GAS TURBINE ENGINE HAVING ROTARY HEAT EXCHANGERS

[76] Inventor: Jack Guillot, 19 rue Voltaire, Juvisy sur Orge, France

[22] Filed: Aug. 12, 1970

[21] Appl. No.: 63,217

[52] U.S. Cl. ............................. 60/39.31, 60/39.51 H
[51] Int. Cl. ................................................ F02c 7/20
[58] Field of Search .60/39.16, 39.31, 39.51 H, 39.33

[56] References Cited

UNITED STATES PATENTS

| | | |
|---|---|---|
| 2,969,644 | 1/1961 | Williams...........................60/39.31 X |
| 3,023,577 | 3/1962 | Williams...........................60/39.16 X |
| 3,271,949 | 9/1966 | Jones................................60/39.31 X |
| 3,306,036 | 2/1967 | Wooler.............................60/39.16 |
| 3,386,242 | 6/1968 | Trapp................................60/39.16 |
| 3,481,145 | 12/1969 | Oldfield...........................60/39.16 X |
| 3,557,551 | 1/1971 | Campbell.........................60/39.16 |

Primary Examiner—Carlton R. Croyle
Assistant Examiner—Robert E. Garrett
Attorney—Irving M. Weiner

[57] ABSTRACT

A gearbox for driving the various accessories of a gas turbine provided with rotating heat exchangers. The gearbox has a triangular shape and fits on the front of the turbine. An electric starter is mounted on the gearbox casing parallel to the longitudinal axis of the turbine and extends under one end of the turbine.

10 Claims, 6 Drawing Figures

INVENTOR
JACK GUILLOT

GEARBOX FOR CONTROLLING THE MECHANISMS OF A GAS TURBINE ENGINE HAVING ROTARY HEAT EXCHANGERS

The present invention relates to a gearbox which is adapted to be secured to one end of a turbine having at least one heat exchanger. In particular, the invention relates to a gearbox which is adapted to drive the various accessories of a gas turbine that is provided with rotating heat exchangers.

BACKGROUND OF THE INVENTION

The gearbox according to the present invention is especially useful in conjunction with gas turbines which are particularly designed to be used on vehicles.

Such a gas turbine comprises a first shaft on which there are keyed the rotor of a centrifugal compressor and the rotor of a high pressure turbine, and a second shaft which supports the rotor of a low pressure turbine. The front end of the first shaft is used for driving the gearbox. It is known that the speed of rotation of this first shaft is very high. It can be in the order of 40,000 r.p.m. to 50,000 r.p.m. On the other hand, on either side of its general longitudinal axis, the turbine has two rotating heat exchangers whose speed of rotation is very low, for example, in the order of 20 r.p.m. These requirements set for the engineer a problem of speed reduction which is all the more difficult because the axes of rotation of the exchangers are perpendicular to the general longitudinal axis of the turbine.

It is an object of the present invention to solve this problem in a satisfactory manner, while giving the gearbox a shape which facilitates and makes possible a preferred mounting of the customary electric starter, the latter, in practice, no longer extending beyond the outer peripheral shape of the turbine so that the mounting of the turbine, for example, on a lorry is facilitated.

SUMMARY OF THE INVENTION

The present invention provides a gearbox which is adapted to be secured to one end of a turbine having at least one heat exchanger. The gearbox includes a substantially triangular shaped gearbox casing which is removably secured to the casing of the turbine with the driving shaft of the gearbox connectable to the driving shaft of the turbine. An electric starter is mounted on the gearbox casing and is disposed substantially parallel to the longitudinal axis of the turbine and extends under one end of the turbine. An output shaft extends through the gearbox casing for driving a transmission connected to a turbine heat exchanger and being driven by the gearbox driving shaft at a speed reduction of substantially 1:20.

According to one embodiment of the present invention there is provided a gearbox adapted to be secured to one end of a gas turbine incorporating rotating heat exchangers, the gearbox comprising a substantially triangular shaped casing adapted to be detachably secured to the casing of the turbine with a driving shaft of the turbine connectible to a driving shaft of the gearbox by a splined sleeve. A fan shaft is provided in the gearbox casing adjacent to the upper apex thereof and the gearbox driving shaft. A flange at a lower part of the gearbox casing is employed for mounting an electric starter arranged parallel with the general longitudinal axis of the turbine and extending under said one end of the turbine. An output shaft at the lower part of the gearbox casing drives a transmission connected to the turbine heat exchangers and is driven by the gearbox driving shaft at a speed reduction of about 1:20.

Preferably, the transmission comprises a longitudinal shaft extendable under the turbine and connected by Cardan joints to the gearbox output shaft and to a worm meshing with a toothed wheel. The toothed wheel is connected at both sides by a transverse shaft and Cardan joints to a pinion adapted to mesh with a toothed peripheral ring of one of the heat exchangers.

DETAILED DESCRIPTION OF A PREFERRED EMBODIMENT OF THE INVENTION

Figure 1:
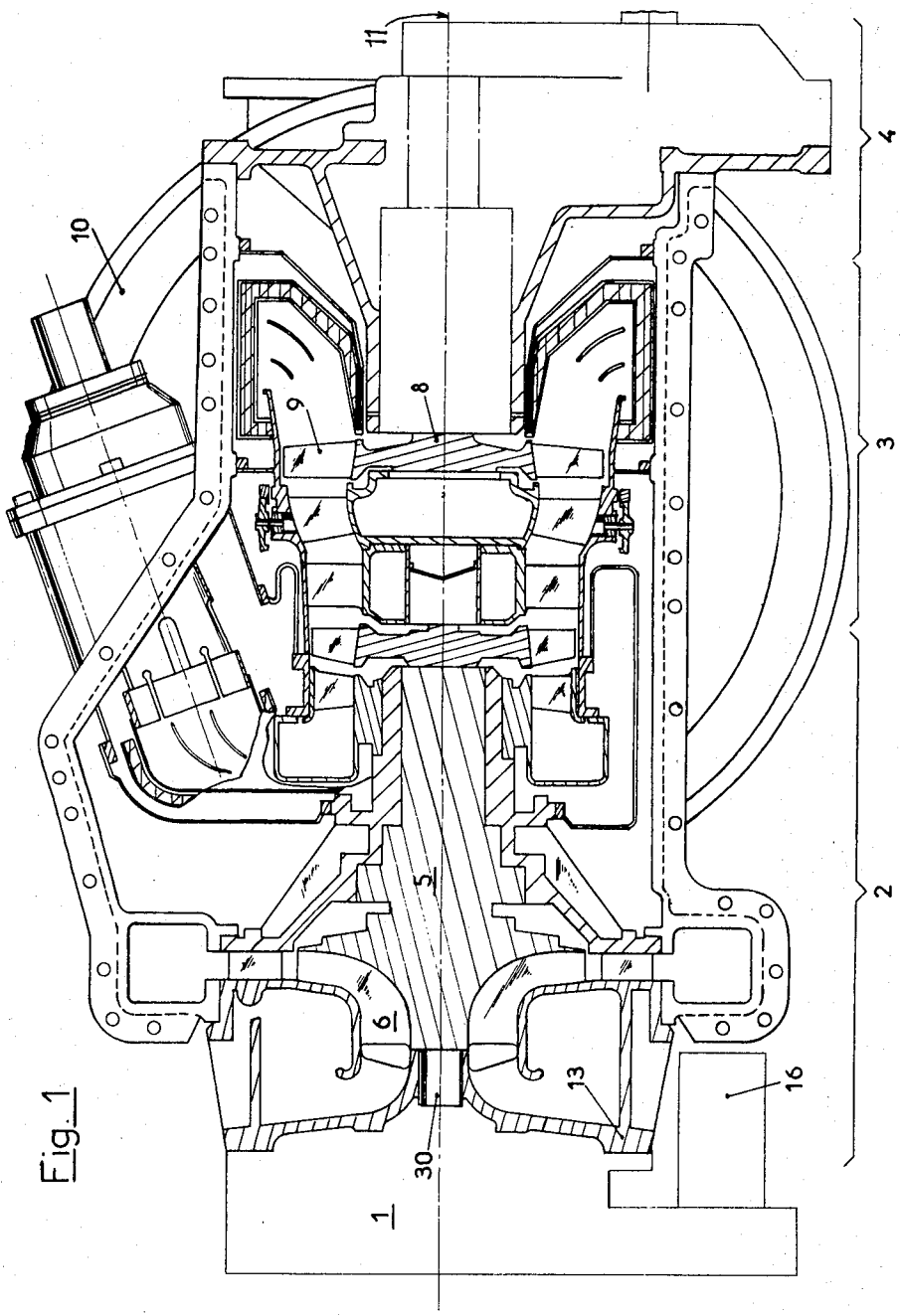
FIG. 1 is a longitudinal section of a gas turbine provided with a gearbox according to the invention.

There is shown in the drawings a gearbox 1 according to the invention which is designed to insure control of the auxiliary parts of a gas turbine.

The gas turbine shown in FIG. 1 comprises several stages, namely, a gas generator stage 2, a power stage 3 and a reduction gear stage 4. This turbine comprises two separate shafts, namely a first shaft 5 for the rotor of a centrifugal compressor 6 and the rotor of a high pressure turbine 7 (gas generator stage 2), and a second shaft 8 for the rotor of a low pressure turbine 9 (power stage 3). In addition, two rotating heat exchanges 10 are located on either side of the general longitudinal axis 11 of the machine.

The gearbox 1 may have a casing 12 fixed to the front of the casing 13 of the gas generator stage 2 by means of a support flange 14. The mounting may be effected by screws 15 (see FIG. 2) or other suitable fastening means. The shape of the casing 12 (FIGS. 1 and 2) is chosen so as to insure a continuity of shape with that of the turbine, while still providing access to the various components thereof. These components include the following.

An electric starter 16, the output shaft 17 of which is parallel to the general longitudinal axis 11 of the turbine, may be housed at the rear of the casing 12 and may be supported on an annular flange 18 open toward the rear at the front of the turbine.

A pulley 19 is provided for the belt drive of a recharge generator (not shown) and of known construction.

Figure 5:
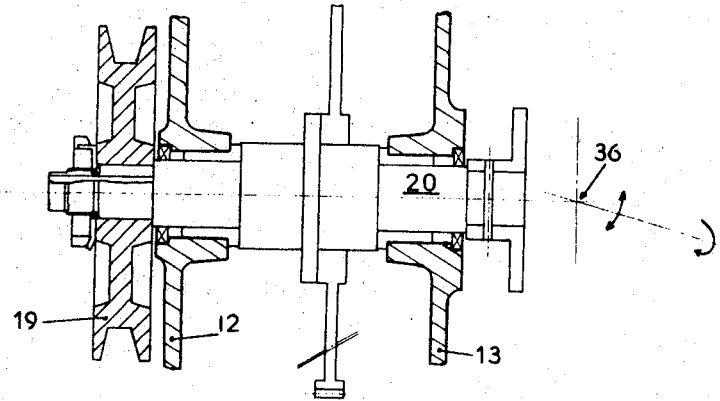
Figure 6:
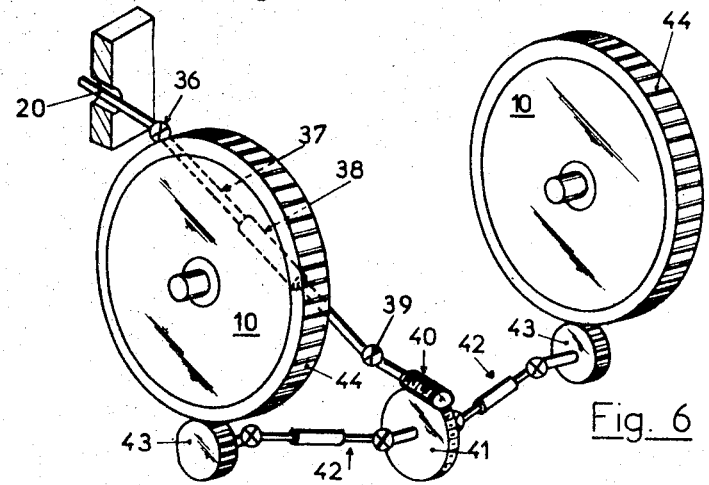
FIG. 6 is a diagrammatic perspective view of the transmission for driving the rotating heat exchangers.

A rotating shaft 20 extends in an air-tight manner through the part of the casing 13 forming the rear of the gearbox to drive the transmission linkage for driving the rotating heat exchangers 10 (see FIGS. 5 and 6).

A hydraulic regulator 21 having a support shaft 24 may be incorporated in the rear part of the gearbox.

A shaft 22 may be provided for driving, on the one hand, two oil pumps 23 and 25 secured at the front of the casing 12, and on the other hand, a fuel pump 26 secured at the rear of the casing 13.

The rotor 27 of a cooling fan may be keyed on a shaft 28 which extends beyond the front of the casing 12.

All the rotating shafts 17, 20, 22, 24 and 28 are parallel to the general longitudinal axis 11 of the turbine.

The front casing 12 of the gearbox has a substantially triangular shape (FIG. 2), the upper apex of which is occupied by a shaft 29 driven directly by the front splined end of the first shaft 5. The connection between the driving shaft 30 and the shaft 29 is ensured by splined sleeves connected by an internal and intermediary splined shaft 31.

Figure 2:
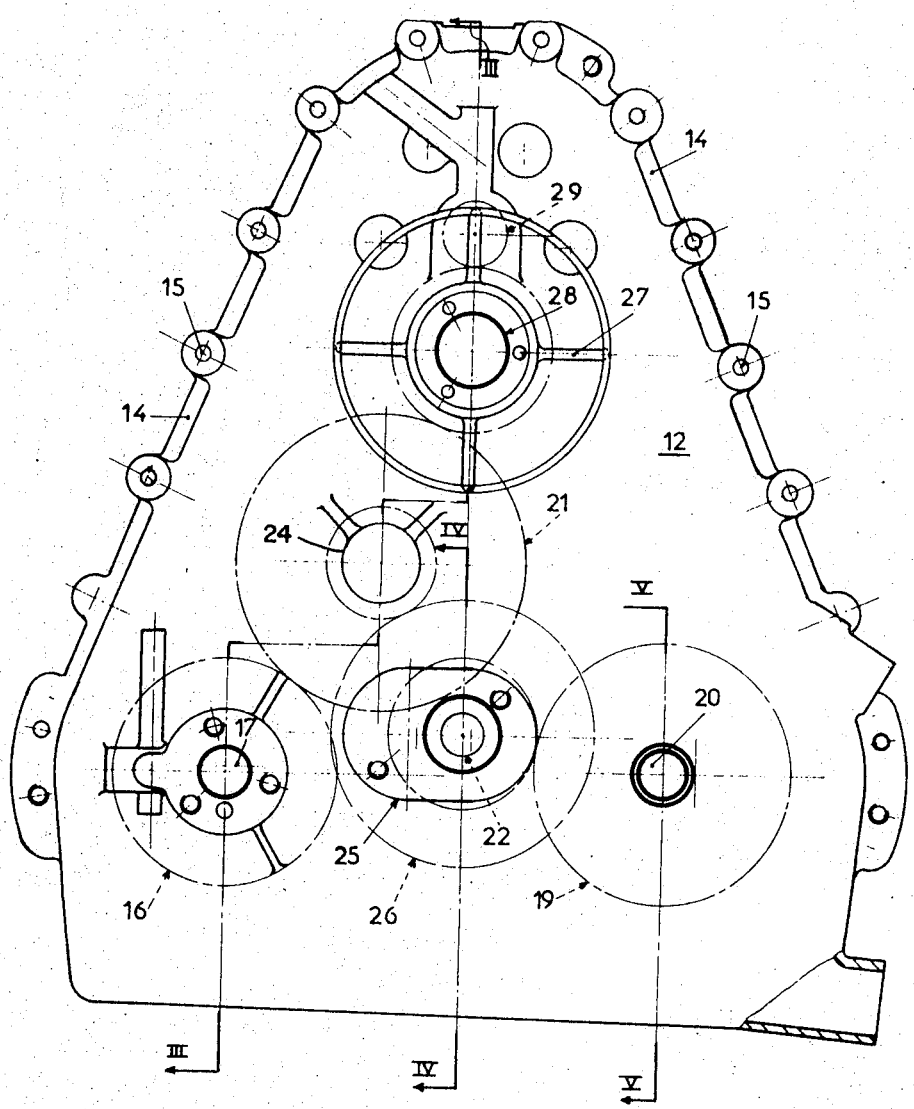
FIG. 2 is a front view of the casing of the gearbox.
Figure 3:
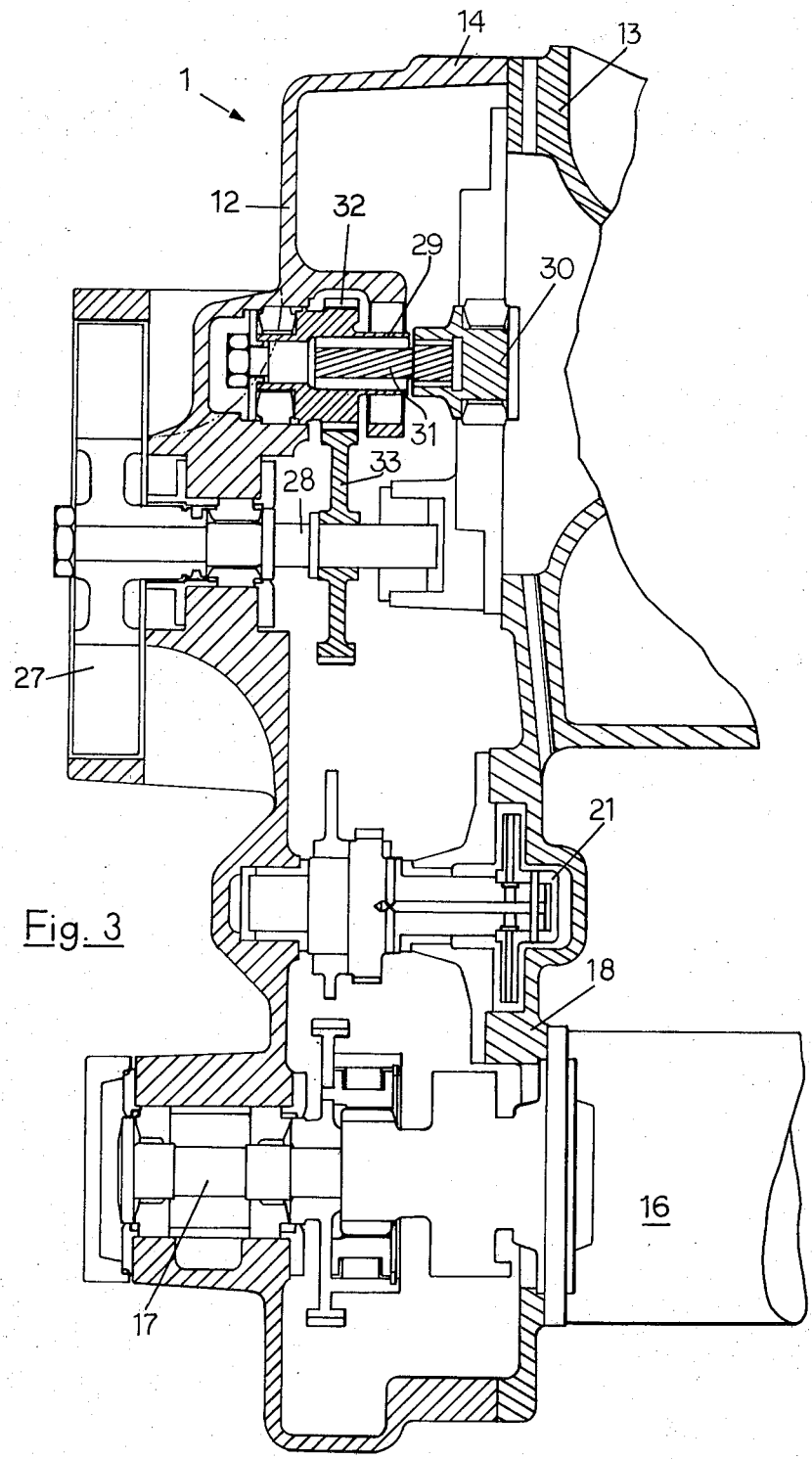
FIGS. 3, 4 and 5 are respectively sections on the lines III—III, IV—IV and V—V of FIG. 2.

On the driving shaft 29 there is keyed a pinion 32 which meshes directly with a pinion 33 on the fan shaft 28. Thus, this shaft 28 is located in the vicinity of the upper apex of the triangular casing 12, immediately below the shaft 29 (FIG. 2).

The transmission of movement to the various shafts 17, 20 and 22 and shaft 24 of the regulator 21 is effected in known manner by gear trains (not shown).

It is to be noted that the shafts 17 and 20 are located in the lower part of the casing 12, each adjacent to one of the two lower apexes of the triangle. As previously stated, the electric starter 16 which drives the shaft 17 is located at the rear of the gearbox 1, underneath the front of the turbine (FIG. 1). Thus, this electric starter 16, in practice, does not extend beyond the outer shape of the turbine, thus facilitating the mounting of the latter on a lorry.

Figure 4:
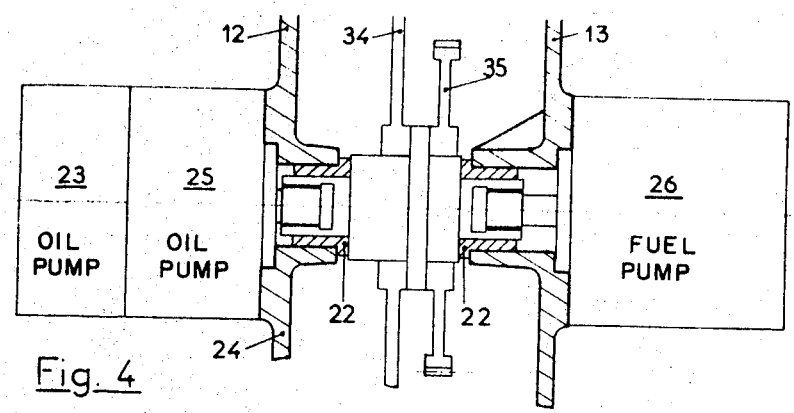

The shaft 22 of the pumps 23, 25 and 26 is provided with two transmission pinions 34 and 35 (FIG. 4).

The shaft 20 extends in an air-tight manner both beyond the front of the casing 12 and the rear of the casing 13. At the front, this shaft 20 supports the pulley 19 for controlling the generator. At the rear, it drives by means of a first Cardan joint 36, a transmission shaft 37 provided with a sliding sleeve 38. This shaft 37 arranged longitudinally under the turbine drives, through the intermediary of a second Cardan joint 39, a worm 40.

The worm 40 meshes with a toothed wheel 41, which, by means of transverse shafts 42 with sliding sleeves and Cardan joints, drives two lateral pinions 43. The latter each mesh directly with the outer toothing 44 of one of the rotating heat exchangers 10.

It is thus seen that the gear reduction between the driving shaft 29 of the gearbox and the exchanger discs 10 is effected on the one hand, inside the gear box 1 (reduction ratio of the order of 1 to 20 between the shaft 29 and the shaft 20) and, on the other hand, by means of the transmission linkage 40, 41, 43 and 44 (reduction ratio of the order of 1 to 100).

I claim:

1. A gearbox adapted to be secured to one end of a gas turbine engine having at least one heat exchanger, comprising in combination:
   - a substantially triangular shaped gearbox casing removably secured to the casing of said turbine with the driving shaft of said gearbox connectable to the driving shaft of said turbine;
   - an electric starter mounted on said gearbox casing and disposed substantially parallel to the longitudinal axis of the turbine and extending under one end of said gas turbine engine casing; and
   - an output shaft extending through said gearbox casing for driving a transmission connected to said heat exchanger and being driven by said gearbox driving shaft at a speed reduction of substantially 1:20.

2. A gearbox as defined in claim 1 and being adapted to be secured to an end of a gas turbine engine incorporating rotating heat exchangers, in which said substantially triangular shaped gearbox casing is adapted to be detachably secured to a casing of the turbine with a driving shaft of the turbine connectable to said gearbox driving shaft by a splined sleeve, and including a fan shaft in said gearbox casing adjacent said gearbox driving shaft and the upper apex of said gearbox casing, a flange at the lower part of said gearbox casing for mounting said electric starter, and said output shaft is disposed at the lower part of said gearbox casing for driving said transmission connected to said heat exchangers.

3. A gearbox as defined in claim 2, in which said gearbox output shaft extends towards the rear of said gearbox casing for driving said transmission and extends towards the front of said gearbox casing for mounting a pulley which drives a generator.

4. A gearbox as defined in claim 2, in which said flange for mounting said electric starter is an annular flange and the arrangement is such that said electric starter is positioned within the confines of the engine casing.

5. A gearbox as defined in claim 2, in which said gearbox driving shaft is located in the upper part of said gearbox casing near the upper apex of said substantially triangular shaped casing.

6. A gearbox as defined in claim 2, in which said fan shaft is located immediately below said gearbox driving shaft.

7. A gearbox as defined in claim 2, including a fuel pump and two oil pumps keyed onto a single shaft, said fuel pump being affixed on the rear end of said single shaft, and said oil pumps being affixed on the front side of said gearbox casing.

8. A gearbox as defined in claim 1, in which said gearbox output shaft extends towards the rear of said gearbox casing for driving said transmission and extends towards the front of said gearbox casing for mounting a pulley which drives a generator.

9. A gearbox as defined in claim 1, in which said gearbox driving shaft is disposed in the upper portion of said gearbox casing near the upper apex of said substantially triangular shaped casing, and said electric starter is positioned within the confines of the engine casing.

10. A gearbox as defined in claim 1, including a fuel pump and two oil pumps keyed onto a single shaft, said fuel pump being affixed on the rear end of said single shaft, and said oil pumps being affixed on the front side of said gearbox casing.

* * * * *